United States Patent [19]

Linfield

[11] 4,204,342
[45] May 27, 1980

[54] ELEVATION SIMULATION FOR FREQUENCY SCAN THREE DIMENSIONAL RADAR

[75] Inventor: Wayne S. Linfield, Sparks, Md.

[73] Assignee: The United States of America as represented by the Secretary of the Navy, Washington, D.C.

[21] Appl. No.: 40

[22] Filed: Jan. 2, 1979

[51] Int. Cl.$^2$ .............................................. G01S 7/40
[52] U.S. Cl. ..................................... 35/10.4; 343/17.7
[58] Field of Search ......................... 35/10.4; 343/17.7

[56] References Cited

U.S. PATENT DOCUMENTS

| | | | |
|---|---|---|---|
| 2,693,647 | 11/1954 | Bolster et al. | 35/10.4 |
| 2,811,789 | 11/1957 | Paine | 35/10.4 |
| 2,938,278 | 5/1960 | Brown | 35/10.4 |
| 3,060,424 | 10/1962 | Hansen | 343/17.7 |
| 3,894,347 | 7/1975 | Sleven et al. | 35/10.4 |
| 3,971,020 | 7/1976 | Howard | 343/7.9 |
| 4,158,840 | 6/1979 | Schwab | 343/7.9 |

Primary Examiner—T. H. Tubbesing

Attorney, Agent, or Firm—Richard S. Sciascia; Joseph M. St. Amand

[57] ABSTRACT

A system for simulating, in the elevation dimension, an environment of targets, ground clutter and chaff to a frequency scan (inertialess) three-dimensional radar system transmitting frequency differentiated pencil beams to provide an elevation scan. To generate targets, the radar elevation simulation system determines the pencil beams in which a simulated target would appear and generates simulated target echo signals, frequency and time differentiated to correspond to the frequency and transmission time for the selected beams. For passive interference generation, the elevation simulation system gates on simulated ground clutter at short range and low elevation angles and simulated chaff at longer range and higher elevation angles and generates corresponding frequency and time differentiated simulated echo signals. The simulated target and simulated passive interference echo signals are mixed and then fed to the frequency scan radar system for conventional presentation on the radar displays.

14 Claims, 4 Drawing Figures

ELEVATION SIMULATION FOR FREQUENCY SCAN THREE DIMENSIONAL RADAR

BACKGROUND

The present invention relates to systems for simulating an environment of targets and passive interference to a frequency scan three dimensional radar system and more particularly to systems for simulating such an environment in the elevation dimension. In even greater particularity, the present invention pertains to systems for simulating an environment in the elevation dimension for either the frequency scan, the long pulse or the pulse compression transmission mode of such a radar system.

Radar simulators are well known in the art, having been used advantageously for many years in conjunction with training and other simulation purposes. As radar systems have become more complex, the associated simulation techniques required to adequately present a simulated environment have also had to increase in sophistication. In the case of the frequency scan (inertialess) three-dimensional radar system, well known two-dimensional simulation techniques for generating basic video simulation signals, including range, azimuth gating and size control, are readily applicable. However, heretofore, simulation systems incorporating the capability of simulating the elevation dimension to a frequency scan radar system have not been available.

SUMMARY OF THE INVENTION

It is therefore a general object of the present invention to provide a system for simulating in the elevation dimension an environment including targets, ground clutter and chaff to a frequency scan three-dimensional radar system transmitting in either the frequency scan, long pulse or pulse compression mode.

Accordingly, to accomplish this and other objects the present invention provides simulated target echo and simulated ground clutter and chaff echo signals to a frequency scan (inertialess) three-dimensional radar system. A frequency scan radar system scans in the elevation dimension by means of multi-pulsed pencil beams, each comprising a group of discrete, frequency differentiated sub-beams. For each vertical sector at an arbitrary azimuth, an elevation sensing circuit, interfacing with the frequency scan radar system, generates a radar elevation voltage corresponding to the instantaneous elevation angle for a transmitted multibeam group. Correlating this instantaneous elevation angle information with the preestablished coordinates for a simulated environment of targets, ground clutter and chaff, the radar elevation simulation system separately generates simulated target echo and simulated passive interference echo signals to represent this simulated environment. These simulated echo signals are amplified and then are mixed and fed to the frequency scan radar system for display presentation.

For simulated target echo generation, an arbitrary number of simulated targets is each designated in the elevation dimension by a target elevation voltage. In a given vertical sector, the appropriate target elevation voltage(s) is compared with the instantaneous radar elevation voltage; if the voltages compare within limits preset to represent radar beam width, the target elevation voltage is gated and applied to a multi-channel target generation circuit, each channel corresponding to a respective sub-beam of the transmitted radar beam-group. The target generation circuit selects the channels corresponding to the sub-beams in which the simulated target would appear in accordance with the elevation of the simulated target within the angular sector of the radar beam-group and the degree of overlap among adjacent sub-beams. On the selected channels, the target generation circuit generates frequency and time differentiated pulses corresponding to the frequency and transmission time of the respective transmitted sub-beams. These frequency and time differentiated pulses are then summed to obtain the multi-pulse simulated target echo signal.

For simulated passive interference generation, the radar elevation simulation system gates on simulated ground clutter at short range and low antenna elevation angles and simulated chaff at longer range and higher elevation angles. The gated passive interference signals are applied to a multichannel passive interference generation circuit, each channel corresponding to a respective sub-beam of the transmitted radar beam group. On each channel, the passive interference generation circuit generates a frequency and time differentiated pulse corresponding to the frequency and transmission time of the respective transmitted sub-beam. These frequency and time differentiated pulses are then summed to obtain the multi-pulse simulated passive interference echo signal.

When the frequency scan radar system is switched from the frequency scan mode to the long pulse transmission mode, one channel of the target generation circuit is used to indicate the presence of a simulated target by generating a single-pulse, simulated target echo signal corresponding to the frequency and transmission length for the radar's long pulse transmission. Similarly, a single-pulse, simulated passive interference echo signal representing the presence of simulated ground clutter or chaff is generated on the channel of the passive interference generation circuit which corresponds to the long pulse transmission frequency.

Finally, when the frequency scan radar system is switched to the pulse compression transmission mode, simulated target presence is indicated by means of a pulse compression circuit which generates a variable frequency pulse correlated to the pulse compression transmission characteristics of the frequency scan radar system. Two such variable frequency circuits exist. When these pulses are summed, they provide a target simulated echo signal capable of indicating the presence of two targets closer together than the long pulse width without any interference in separate simulation generation. The generation of simulated passive interference echo signals in the pulse compression transmission mode is identical to that for the long pulse transmission mode.

The novel features believed to be characteristic of the present invention are set forth in particularity in the appended claims. However, a more complete appreciation of the present invention, both as to organization and mode of operation, and many of the attendant advantages thereof will result as the same becomes better understood by reference to the following detailed description when considered in conjuction with the accompanying drawings.

DESCRIPTION OF THE PREFERRED EMBODIMENTS

Figure 1:
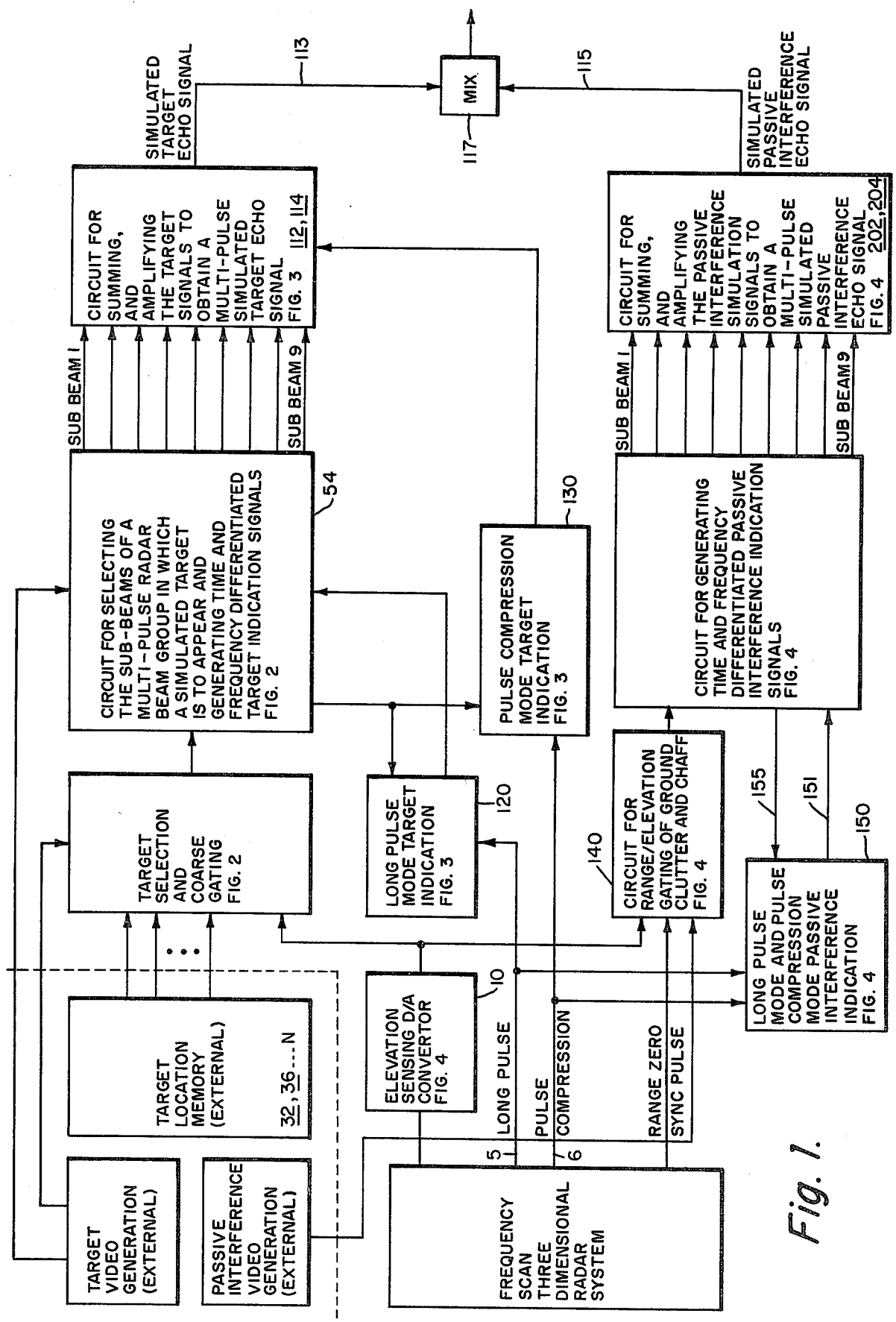
FIG. 1 is a functional block diagram showing the intercoupling for the various functionally distinct networks of a specific embodiment of the radar elevation simulation system for simulating, in the elevation dimension, an environment of targets, ground clutter and chaff to a frequency scan three-dimensional radar system according to the present invention, the radar elevation simulation system being generally organized into a target generation channel and a passive interference (ground clutter and chaff) channel.

Before commencing a detailed description of a preferred embodiment of the radar elevation simulation system, a discussion of the frequency scan (inertialess) three-dimensional radar system is germane. For convenience, in the following description and the detailed description, representative frequencies, pulse widths, beam groups and other parameters are used; however, it is to be understood that the present invention is by no means restricted to the parameters given.

The frequency scan (inertialess) three-dimensional radar system scans in the elevation dimension by means of a "pencil beam", multi-pulse scan performed by means of the frequency scan method. In accordance with techniques known in the radar art, microwave energy at a frequency progressively varied in discrete steps is applied to a frequency sensitive antenna configuration. The antenna system is responsive to the applied microwave energy to radiate a narrow, pencil beam at a precise elevation angle depending on the instantaneous frequency of the input microwave energy. And, by reciprocity, such an antenna system is also able to receive reflected microwave energy in accordance with the same pencil beam pattern. Typically, the frequency scan radar system actually transmits multi-pulsed radar beams composed of a plurality of sub-beam pulses; these sub-beams progressively differ from each other in microwave frequency and therefore, in transmitted elevation angle within the vertical sector of the radar beam envelope. The sub-beam pulses generally exhibit a degree of angular overlap such that a point target appears in a predetermined number of adjacent sub-beams. By means of this frequency scan method, the radar system can scan an arbitrary vertical sector (typically 45 degrees) with a series of multi-pulsed, frequency differentiated radar beams which sweep through the entire vertical sector in small angular steps. This elevation scan is performed repetively and relatively rapidly as the azimuth scan is being continuously but much more slowly carried out (by conventional servo-mechanical rotation of the antenna system).

For the purposes of the detailed description of the preferred embodiment, the frequency scan radar system is assumed to transmitt multi-pulsed radar beams of 27 microsecond duration, each multi-pulsed radar beam being composed of nine sub-beam pulses of 3 microseconds each (disregarding the negligible time required to switch from one discrete frequency to another). The nine sub-beams of a given multi-pulsed radar beam (numbered 1–9 corresponding to successively higher elevation angles within the sector defined by the respective radar beam group) exhibit a degree of angular overlap such that a target normally appears in four adjacent sub-beams.

One particular and apparent advantage of the frequency scan method is that it permits the concentration of all transmitted power into a small angular sector. To obtain an even greater concentration of transmitter power (usually in military applications) a frequency scan three-dimensional radar system can incorporate two additional radar transmission modes besides the above described frequency scan mode—a long pulse transmission mode and a pulse compression transmission mode. The radar elevation simulation system according to the present invention incorporates the capability for simulating these transmission modes.

For a frequency scan radar system transmitting in the long pulse transmission mode, a single long pulse of a duration equal to the transmission length of a multipulsed radar beam group is transmitted at a frequency corresponding to one of the sub-beams of the respective radar beam group. To illustrate, in terms of the above indicated parameters, the radar system in the long pulse transmission mode would transmit a radar pulse of 27 microseconds duration at the frequency and elevation angle corresponding to the sub-beam 5 of a respective radar group. Thus, the radar transmitter power is concentrated in the single sub-beam 5 of the respective radar beam group rather than being distributed among nine, elevation differentiated sub-beams. The long pulse transmission mode can be used to place more transmitter power on an ill-defined target. However, because of the relatively long pulse duration, target range is obscured (for example, a 27 microsecond echo return signal would indicate a target approximately 6 kilometers long).

The pulse compression transmission mode is used to obtain an echo return signal of a relatively short duration by transmitting a long pulse of constantly varying frequency. An echo return signal received by the radar system is channeled through a dispersive delay line which introduces a frequency dependent time delay to the signal. For example, the radar system might transmit a 27 microsecond pulse progressively varying in frequency from 30 to 40 megacycles with the dispersive delay line introducing a progressive time delay of between 50 microseconds at 30 megacycles and 40 microseconds at 40 megacycles. In this manner, a frequency variable echo return signal is "compressed" without sacrificing radar beam transmission power.

The radar elevation simulation system according to the present invention provides a simulated environment to such a frequency scan three-dimensional radar system as described above, by generating simulated echo return signals. Since a realistic environment could include not only targets, but also intervening passive interference in the form of ground clutter or chaff, the radar elevation simulation system generates two separate simulated echo return signals—a simulated target echo signal to simulate target echo and a simulated passive interference echo signal to simulate ground clutter and chaff returns. The simulated target echo signals and simulated passive interference echo signals are mixed and then fed back to the radar system for standard PPI and RHI display presentation. It should be noted that the present invention only pertains to simulating the elevation dimension of a three-dimensional radar system and is to be incorporated within a three-dimensional simulation system employing well-known two-dimensional (azimuth and range) simulation techniques. Accordingly, the ensuing detailed description of the preferred embodiment of a radar elevation simulation system is with respect to a vertical sector at an arbitrary azimuth.

Referring now to the drawings wherein like reference characters designate like or corresponding elements throughout the several views, FIG. 1 gives a generalized, functional block diagram indicating the innercoupling among the functionally segregated circuits which comprise the radar elevation simulation system of the present invention as well as the functional interface to the frequency scan three-dimensional radar system and the three-dimensional simulation system. The interface with the frequency scan radar system provides the radar elevation simulation system with a digital radar elevation code representing the instantaneous elevation angle of the transmitted radar beam, a range-zero sync pulse indicating the pulse transmission time for each transmitted radar beam, and mode selection information to indicate the engagement of either the long pulse or pulse compression transmission modes. The interface with the three-dimensional simulation system (indicated, functionally, within the dashed line in FIG. 1) provides the radar elevation simulation system with target elevation information together with target and passive interference video clock pulses which control the generation of the simulated target and simulated passive interference echo signals.

The interface with the three-dimensional simulation system is indicated functionally by means of the blocks within the dashed line in FIG. 1. As noted above, the radar elevation simulation system according to the present invention is incorporated within a three-dimensional simulation system which provides a complete radar simulation system for the frequency scan three-dimensional radar system. The three-dimensional simulation system includes a target location memory which stores the location coordinates (azimuth, range and elevation) for an arbitrary number of targets, a target being designated in the elevation dimension by means of a target elevation voltage. With the frequency scan radar system scanning the vertical sector at a given azimuth, the target location memory provides the radar elevation simulation system with the appropriate target elevation voltage(s) for a respective target(s).

The three-dimensional simulation system also includes target video generation and passive interference video generation networks. These video generation networks provide target video, ground clutter video and chaff video clock signals which control the simultaneous generation of simulated target and simulated passive interference echo signals. These clocking video pulses are time correlated to the range of the corresponding simulated targets and simulated passive interference, allowing the three-dimensional radar system to control the presentation of the simulated environment to the frequency scan radar system. (As discussed below, these clocking video pulses have pulse widths corresponding to the pulse widths of the sub-beams of the transmitter radar beam group).

Within the frequency scan radar system, 9 frequencies representing the 9 beams of a beam group are generated and applied to a mixer. These are intermediate frequencies (IF). A higher frequency (RF, radio frequency) is also applied to the mixer and heterodyned with the 9 beam frequencies and the resultant sum frequency is power amplified and applied to the antenna for transmission. When an echo is received by the antenna, it is heterodyned with the same high frequency resulting in the 9 original IF frequencies (some of them) which are applied to 9 IF amplifiers tuned specifically to these 9 frequencies. Each is then processed and displayed.

For the next beam group, the same thing happens except that the high frequency applied to the mixer is a different frequency than before, representing a different elevation angle of transmission of this beam group. This frequency, when heterodyned with the received echo, provides the same 9 IF frequencies as before, which are the frequencies the 9 IF amplifiers are tuned to.

Since the radar knows what the heterodyne frequency is at any time, it then knows what beam group is being displayed therefor what elevation angle for the return echo.

This invention, although not necessary, takes a shortcut and does not mix a high frequency signal with either the output or the radar received input. Instead, the 9 IF frequencies to which the 9 radar receiver IF amplifiers are tuned are those that are generated by the simulator and they are injected into the radar just ahead of the IF amplifiers. The simulator could use the radars high heterodyning frequency and produce an RF output to the radar antenna. This method obviously would require somewhat more equipment with no appreciable difference in the final operation.

Figure 4:
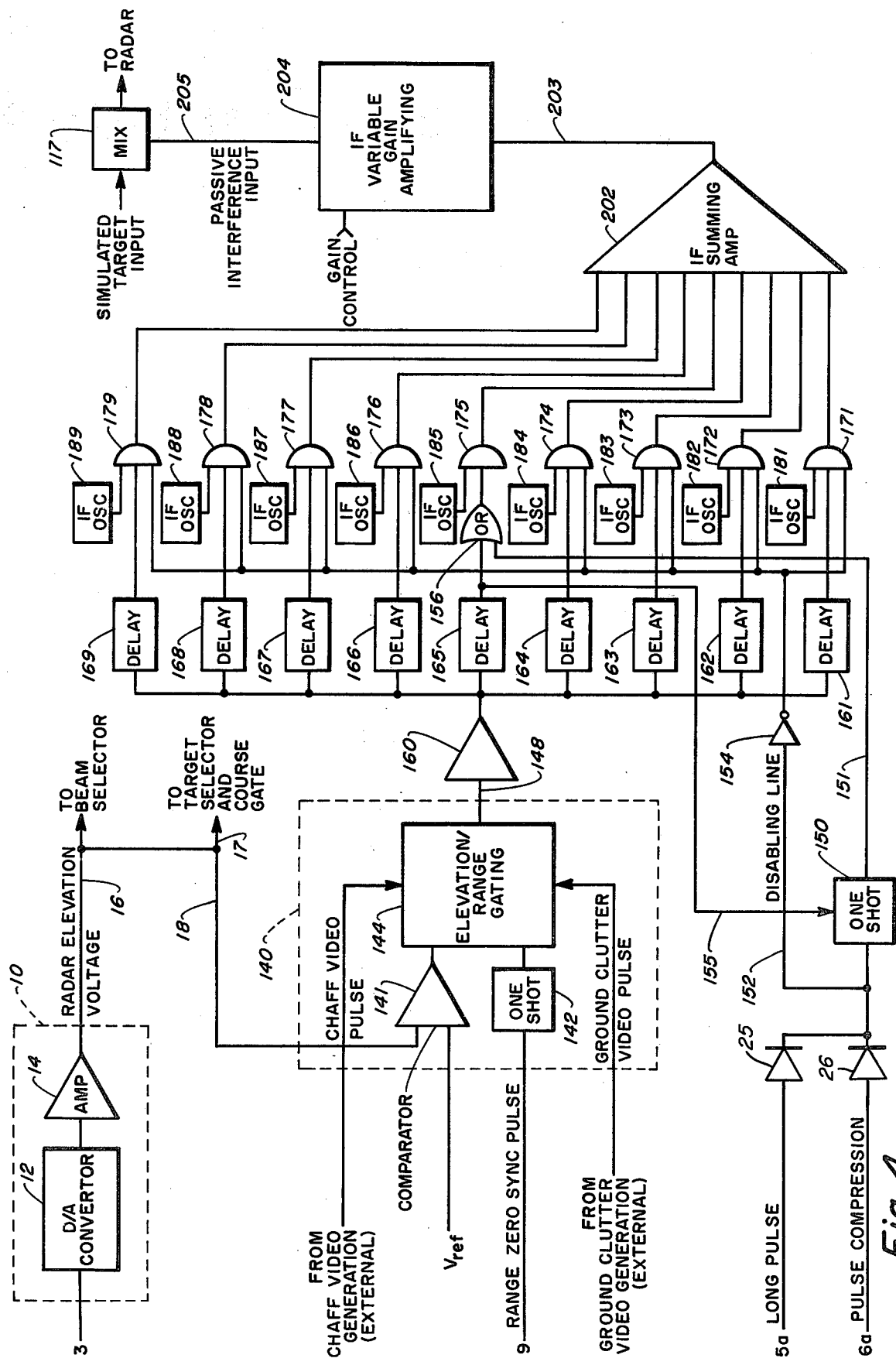
FIG. 4 is a schematic circuit diagram showing the elevation sensing circuit together with the passive interference simulation circuits for range/elevation gating, frequency and time differentiating, and summing and amplifying, for the frequency scan, long pulse and pulse compression transmission modes.

An elevation sensing circuit interfacing with the frequency scan elevation system provides the radar elevation simulation system with continuous, instantaneous radar elevation information while the radar system is scanning. The digital radar elevation code from the radar system is applied to this interfacing elevation sensing D/A converter circuit. Referring to FIG. 4, the elevation sensing D/A converter circuit (indicated generally at 10) is comprised of an integrated circuit D/A converter 12 together with an operational amplifier driver 14. D/A converter 12 receives the digital elevation code via line 3 and converts it to an analog voltage. This voltage is applied to amplifier 14; the output of amplifier 14 appears on line 16 and comprises an analog-equivalent radar elevation voltage which represents the instantaneous elevation angle for a transmitted radar beam. This radar elevation voltage is applied in a manner described below, to the simulated target and simulated passive interference generating networks of the radar elevation simulation system according to the present invention.

The radar elevation simulation system comprises two main channels—a target generation channel for generating simulated target echo signals and a passive interference generation channel for generating simulated passive interference signals. These channels are responsive to the radar elevation voltages from elevation sensing D/A converter 10 together with other inputs from the frequency scan radar system and the three-dimensional simulation system. Their combined output comprises a simulated environment in the elevation dimension for the frequency scan radar system.

Considering first the target generation channel of the radar elevation simulation system, the diagram in FIG. 1 indicates functionally its principal components. For the vertical sector at a given azimuth, the target elevation voltage(s) designating a respective target(s) is applied to a target selection and coarse gating circuit which compares the target elevation voltage(s) with the instantaneous radar elevation voltage from elevation sensing D/A converter. If the two voltages compare within limits preset to represent the beam width of the transmitted multi-pulsed radar beam group, a coarse gate passes the target elevation voltage corresponding to the simulated target. This gated target elevation voltage is applied to a multi-channel circuit which selects the sub-beams of the multi-pulsed radar beam group in which the simulated target is to appear (based on the elevation of the simulated target within the angular sector defined by the radar beam group, and the degree of overlap exhibited by the sub-beams). On the selected channels, the circuit generates frequency and time differentiated target indication signals corresponding to the frequency and transmission time of respective sub-beam pulses. These target indication signals are then summed and amplified to form a simulated, multi-pulse target echo return signal to simulate a multi-beam echo return from an actual target.

Figure 2:
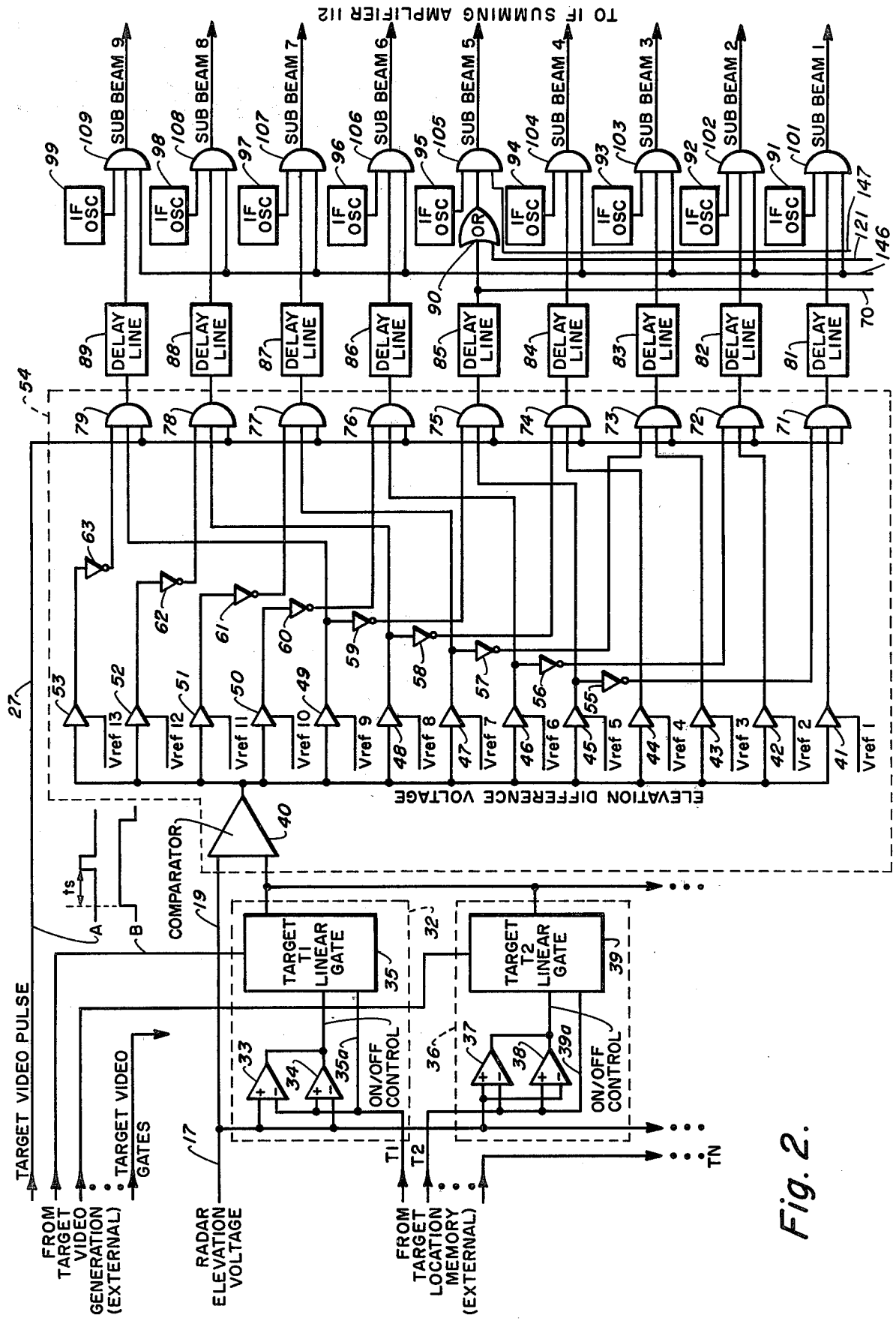
FIG. 2 is a schematic circuit diagram showing the target selection and course gating circuit and the multichannel circuit for generating time and frequency differentiated target simulation signals.
Figure 3:
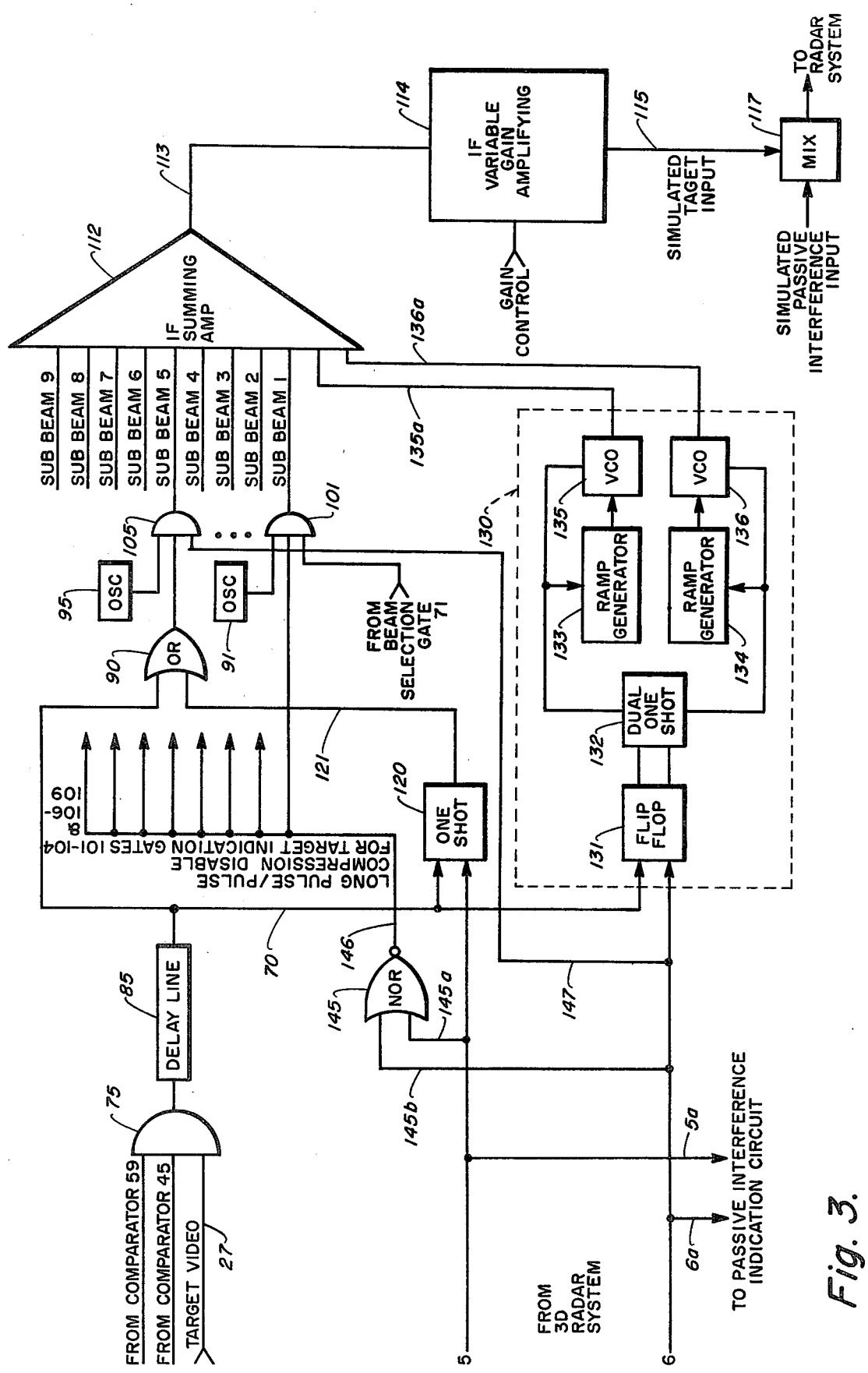
FIG. 3 is a schematic circuit diagram showing the circuits for summing, and amplifying the simulated target echo signals together with the circuits for target simulation in the long pulse and pulse compression transmission modes.

Referring to the more detailed schematic circuit diagrams in FIGS. 2 and 3, the target generation channel of the radar elevation simulation system actually includes a plurality of input target selection and coarse gating circuits (one for each of N simulated targets) each coupled to receive a respective target elevation voltage from the (external) target location memory. To illustrate, FIG. 2 shows a target selection and coarse gating circuit 32 coupled to receive the target elevation voltage designating a simulated target T1 and a target selection and coarse gating circuit 36 coupled to receive the target elevation voltage corresponding to a target T2. Thus, for the vertical sector at the appropriate azimuth, the target elevation voltage designating a simulated target T1 is applied to target selection and coarse gating circuit 32, the target elevation voltage corresponding to a simulated target T2 is applied to target selection and coarse gating circuit 36, and so on for N simulated targets.

The N target selection and coarse gating circuits are identical, each comprising a pair of operational amplifiers configured as a dual comparator and a linear gate circuit. The dual comparator pair establishes a comparison gate having plus and minus limits preestablished to represent the beam width of the transmitted multi-pulse radar beam group. The dual comparator pair compares the target elevation voltage designating to a respective simulated target with the instantaneous radar elevation voltage from elevation sensing D/A converter circuit 10 and provides an ON/OFF control signal to the linear gate circuit.

In addition to the ON/OFF control signal from the dual comparator pair, each linear gate circuit in a respective target selection and coarse gating circuit receives a respective target video gate signal from the (external) target video generation network in the three-dimensional simulation system. The linear gate circuit gates through a respective target elevation voltage if: (1) an ON signal from the corresponding dual comparator indicates that the target elevation voltage and the instantaneous radar elevation voltage compare within the beam-width limits of the transmitted multi-pulse radar beam group and (2) a locking target video gate signal is received from the (external) target video generation network. As noted above, the (external) target video generation network functions to synchronize target generation by the radar elevation simulation system with the three-dimensional simulation system and with the frequency scan radar system. It provides not only the target video gate signal to the N target selection and coarse gating circuits, but also, as discussed below, a target video pulse signal to control simulated target generation from the target generation channel of the radar elevation simulation system.

Now, with respect to the N identical target selection and coarse gating circuits, consider target selection and coarse gating circuit 32 (FIG. 2). It comprises a dual comparator pair formed by operational amplifiers 33 and 34 and a target T1 linear gate circuit 35. The radar elevation voltage from elevation sensing D/A converter circuit 10, representing the instantaneous transmission elevation angle for the multi-pulse radar beam group, is applied via line 17 to the non-inverting input to operational amplifier 33 and the inverting input to operation amplifier 34. The target elevation voltage designating the simulated target T1 is applied to the inverting input of operational amplifier 33 and to the non-inverting input to operational amplifier 34, and also via a line 35a to target T1 linear gate 35. The combined output of the dual comparator pair 33 and 34 provides the enabling ON/OFF control signal for target T1 linear gate circuit 35. If the target elevation voltage designating the simulating target T1 compares with the instantaneous radar elevation voltage within the beam width limits established by the comparison gate, the dual comparator pair 33 and 34 turns on target T1 linear gate 35. This causes target T1 linear gate circuit 35 to gate through the target elevation voltage corresponding to simulated target T1 when enabled by the corresponding target video gate signal. Similarly, target selection and coarse gating circuit 36 is responsive to its target video gate signal to gate the target elevation voltage designating the simulated target T2 when a target T2 linear gate 39 is enabled by means of a dual comparator pair formed by operational amplifiers 37 and 38, and so on for N target simulation and coarse gating circuits.

The gated target elevation voltage from a respective target selection and coarse gating circuit is applied to one input of a comparator 40; the other input to comparator 40 is coupled to receive the instantaneous radar elevation voltage via line 19. Comparator 40 generates an elevation difference voltage corresponding to the difference between the instantaneous radar elevation voltage and the respective target elevation voltage provided by a corresponding target selection and coarse gating circuit. At this point, the instantaneous radar elevation voltage represents the bottom of the transmitted multi-pulse beam group while the elevation difference voltage represents the elevation of the respective simulated target within the angular sector of the radar beam group.

The elevation difference voltage from comparator 40 is applied to each of 13 beam selector comparators 41–53 (the significance of having 13 beam selection comparators will become apparent below). Beam selection comparators 41–53 are successively referenced to ascending voltages from a resistive voltage divider such that, for increasing values of the elevation difference voltage (corresponding to increasing simulated target elevation within the angular sector of the radar beam group), an increasing number of the comparators turns on.

The 13 beam selection comparators 41-53 are coupled to nine beam selection gates 71-79 as follows. Comparators 41-44 are coupled to respectively beam selection gates 71-74. Beam selectors 45-49 are coupled both to, respectively, beam selection gates 75-79, and through respective inverters 55-59 to, respectively, beam selection gates 71-75. Comparators 50-53 are coupled through respective inverters 60-63 to, respectively, beam selection gates 76-79. Thus, each of the beam selection gates 71-79 receives two inputs (one inverted) from two separate comparators (an enabling third input is discussed below). This inter-coupling assures that, for a given elevation difference voltage, at most four of the beam selection gates 71-79 can be in the ON state (depending on the enabling input discussed below). For example (and disregarding for the moment the enabling third input to the beam selection gates), progressively increasing values for the elevation difference voltage permit, first, beam selection gate 71, and then successively, 72, 73 and 74 to switch ON. The next incremental increase in the applied elevation difference voltage permits beam selection gate 75 to turn on but simultaneously, through inverter 55, turns off beam selection gate 71, leaving beam selection gates 72-75 capable of being in the ON state. The effect of further incremental increases in elevation difference voltage is apparent.

The nine beam selection gates 71-79 together with comparator 40 and beam selection comparators 41-53 comprise a multi-channel beam selection circuit with each of nine target indication channels being defined by a respective one of the nine beam selection gates. The nine target indication channels correspond to the nine sub-beams of the multi-pulse radar beam group, with a target indication channel 1 defined by beam selection gate 71 corresponding to sub-beam 1, a target indication channel 2 defined by beam selection gate 72 corresponding to sub-beam 2, and so on. The function of the nine target indication channels of beam selector circuit 54 is to select the sub-beam(s) of a transmitted radar beam group in which a simulated target is to appear, and generate target indication pulses on up to four corresponding target indication channels.

The limitation of at most four simultaneous target indication pulses follows from the degree of sub-beam overlap within the radar beam group. As noted above, for the purposes of the detailed description it is assumed that the sub-beams of each transmitted radar beam group exhibited a degree of angular overlap such that a target would normally appear in four adjacent sub-beams. Accordingly, this operational parameter is incorporated into beam selection circuit 55 which can select at most four adjacent target indication channels corresponding to at most four adjacent radar sub-beams.

As indicated above, for each transmitted multi-pulse radar beam group, a simulated target is designated by an elevation difference voltage applied to beam selector circuit 54 and corresponding to the elevation of the simulated target within the angular sector defined by the radar beam group. Beam selector circuit 54 selects the target indication channels (up to four) corresponding to the sub-beams of the transmitted radar beam group in which a real target, elevation correlated to the target elevation voltage of the simulated target, would appear. With the appropriate target indication channel selected, beam selector circuit 54 is responsive to an enabling target video pulse from the (external) target video generation network to generate the target indication pulses which represent the presence of a simulated target. These target video pulses are generated at the three-dimensional simulation system and applied via line 27 to each of the nine beam selection gates 71-79.

The target video pulses correlate target indication pulse generation, and thereby simulated target generation, with the transmission time for the transmitted multi-pulse radar beam group and with the range of the simulated target. (Note the general relation between the target video pulse and the target video gate signal represented by, respectively, waveforms A and B. The time $T_s$ between the start of target elevation voltage gating and the start of target indication pulse generation permits beam selector circuit stabilization.) The pulse width of the target video pulse corresponds to the pulse width of the sub-beam pulses which comprise the radar beam group. Accordingly, a target video pulse applied to beam selection gates 71-79 results in a target indication pulse of a corresponding pulse width being generated on up to four (adjacent) target indication channels selected in the manner described above, by the operation of beam selection circuit 54.

The target indication pulses appearing on respective target indication channels are applied in parallel to respective target indication gates through respective delay lines (FIG. 2). Thus, a target indication pulse appearing on the output of beam selection gates 71-79 is applied, respectively, to target indication gates 101 to 109, through respectively, delay lines 81-89 (beam selection gate 75 being coupled through delay line 85 and an OR gate 90). Target indication gates 101-109 are also coupled to receive oscillator signals from, respectively, oscillators 91-99. In addition, a line 121 is coupled through OR gate 90 to target indication gate 105 while a line 146 is coupled to target indication gates 101 to 104 and 106 to 109. The function of the input lines 121 and 146 to the target indication gates is explained below; for the present discussion they can be disregarded.

The function of delay lines 81-89 is to introduce to respective target indication pulses a time delay corresponding to the transmission time delay for each of the sub-beams of the transmitted radar beam group. Thus, while beam selector circuit 54 is responsive to a target video pulse to generate up to four target indication pulses simultaneously on selected (adjacent) target indication channels, the effect of the delay lines is to cause the target indication pulses to appear at respective target indication gates successively to comport with the actual transmission time for the corresponding sub-beam.

A target indication pulse applied to a respective target indication gate gates on, for the duration of the target indication pulse (corresponding, from above, to the pulse widths of the transmitted sub-beam), a target indication signal at the frequency of the respective input oscillator signal. In this manner, the successive arrival of time delayed target indication pulses generates a corresponding succession of (up to four) simulated target signals, each at the frequency of the respective oscillator. For a target indication gate on a respective target indication channel, the input oscillator signal corresponds in frequency to the intermediate frequency of the associated sub-beam of the transmitted radar beam group. To summarize, the above described simulated target generation operation results in a succession of from one to four adjacent, frequency and time differentiated target simulation signals each relating in frequency duration to the frequency and duration of the respective sub-beams of the transmitted radar beam group and in time of generation to the time of transmission of the respective sub-beams and the range of the simulated target.

The frequency and time differentiated target simulation signals are successively applied to a summing amplifier 112 shown in FIG. 3. Summing amplifier 112 includes nine inputs each coupled to receive a target simulation signal from a corresponding target indication gate. Summing amplifier 112 sums the applied frequency and time differentiated target simulation signals into a multi-phase simulated target echo signal comprised of the successively applied target simulation signals in series, each target simulation signal correlated to the transmitted multi-pulse beam group and the range of the simulated target as described above. Accordingly, the multi-pulse simulated target echo signal from summing amplifier 112 corresponds to the target echo signal which would be received by the frequency scan radar system for an actual target at the coordinates assigned to the simulated target.

The multi-pulse simulated target echo signal is applied via line 113 to a (variable gain) amplifier network 114 which amplifies the signal and controls its amplitude. At this point, the simulated target echo signal comprises a frequency and time differentiated pulse train equivalent in time of generation, pulse width, and pulse frequency to the target echo return signal which would be received by the frequency scan three-dimensional radar system for an actual target at the coordinates assigned to the simulated target. The multi-pulse simulated target echo signal is applied via line 115 to a mixing network 117, combined with a simultaneously generated simulated passive interference echo signal, and routed back to the radar system for presentation on standard radar displays.

Referring again to the functional diagram in FIG. 1 the simulated passive interference echo signals which simulate the presence of ground clutter and chaff are generated by the passive interference generation channel of the radar elevation simulation system according to the present invention.

The passive interference generation channel of the radar elevation simulation system, which generates the simulated passive interference echo signals to simulate the presence of chaff and ground clutter to the frequency scan radar system, is functionally depicted in FIG. 1. As in the case of simulated target generation, the generation in the elevation dimension of the simulated passive interference echo signals is synchronized with the frequency scan radar system by means of ground clutter video and chaff video pulses externally generated by a passive interference video generation network at the three-dimensional simulation system. In this manner, the three-dimensional simulation system can control passive interference generation to synchronize the elevation dimension with the range and azimuth dimensions.

The externally generated ground clutter video and chaff video pulses are applied to a circuit which is responsive to the radar elevation voltage from the elevation sensing D/A converter and the range zero sync pulse from the frequency scan radar system to gate on (when a ground clutter video pulse is present) ground clutter at short range and low elevation angles, and to gate on (when a chaff video pulse is present) chaff at longer range and higher elevation angles. These gated passive interference signals are applied to a circuit which generates frequency and time differentiated simulated passive interference signals corresponding to the frequency and transmission time for respective sub-beams of the transmitted radar beam group. These simulated passive interference signals are summed, and amplified to obtain a multi-pulse simulated passive interference echo signal to simulate a multi-beam echo return signal from actual ground clutter or chaff.

Referring now to the more detailed schematic diagram of the passive interference channel of the radar elevation simulation system in FIG. 4, a ground clutter and chaff selection network is indicated generally at 140. It comprises an elevation threshhold comparator 141, a range one-shot 142 and a passive interference indication gate 144. Elevation threshhold comparator 141 is coupled to receive the instantaneous radar elevation voltage via line 18 from elevation sensing D/A converter 10. Range one-shot 142 is triggered by the range-zero sync pulse from the radar system. The respective outputs from elevation threshhold comparator 141 and range one-shot 142 are applied to passive interference indication gate 144; the passive interference indication gate is also coupled to receive the externally generated ground clutter video and chaff video pulses from the passive interference video generation network.

Since ground clutter and chaff normally do not occur simultaneously, the function of ground clutter and chaff selection network 140 is to gate on ground clutter at short range and lower elevation angles and chaff at longer range and higher elevation angles. Range one-shot 142 is triggered by the range-zero sync pulse from the frequency scan radar system, generating a pulse with a pulse width time correlated to the maximum range at which simulated ground clutter is to appear. On the other hand, elevation threshhold comparator 141 compares the instantaneous radar elevation voltage (representing the instantaneous transmission elevation angle for the multi-pulse radar beam group) with a reference voltage (Vref) corresponding to the lowest radar elevation angle at which simulated chaff is to appear and indicates when the instantaneous radar elevation voltage exceeds this threshhold reference voltage.

From above, the range/elevation threshholds outputs from range one-shot 142 and elevation threshhold comparator 141 are applied to passive interference indication gate 144. The passive interference indication gate generates a passive interference indication pulse when: either (1) the elevation threshhold comparator indicates a radar elevation angle below the threshhold elevation angle and the range one-shot indicates a range shorter than the range threshhold, and the externally generated ground clutter video pulse is present, or (2) the range one-shot and the elevation threshhold comparator indicate that the respective range and elevation angle threshholds have been exceeded, and a chaff video pulse is present. (Within respective range threshholds, the actual range of the simulated ground clutter or chaff is determined by the timing of the ground clutter video and chaff video pulses from the three-dimensional simulation system.) The passive interference indication pulses from passive interference indication gate 144 corresponds in pulse width to the input ground clutter video and chaff video pulses. And, for reasons apparent below, the pulse widths of the passive ground clutter video and chaff video pulses correspond to the pulse widths of the sub-beams of the transmitted radar beam groups.

A driver 160 is coupled to receive the passive interference indication pulses from passive interference indication gate 144 via line 148. Driver 160 is coupled to each of nine passive interference indication gates 171–179, through, respectively, nine delay lines 161–169 (driver 160 being coupled through delay line 165 and an OR gate 156 to passive interference gate 175). Each of the passive interference indication gates 171–179 is also coupled to receive an oscillator signal from a respective one of oscillators 181–189. A line 151 couples one-shot 150 to passive interference gate 175 via OR gate 156. In addition, a line 152 is coupled through inverter gate 154 to passive interference indication gates 171–174 and 176–179. The function of the inputs to the passive interference indication gates 171–179 on lines 151 and 152 is explained below. Analogous to target generation, each respective passive interference indication gate together with the associated delay line comprises a passive interference indication channel corresponding to a respective sub-beam of the transmitted radar beam group. Thus, passive interference indication gate 171 and associated delay line 161 corresponds to sub-beam 1, passive interference indication gate 172 and associated delay line 162 correspond to sub-beam 2, and so on.

Simulated passive interference generation on the nine passive interference indication channels is accomplished in a manner analogous to simulated target generation in the target indication channel of the radar elevation simulation system. Driver 160 applies the passive interference indication pulses from passive interference indication gate 144 to each of the nine passive interference indication channels. Delay lines 161–169 introduce successive time delays to the passive interference indication pulses corresponding to the transmission time delays for respective sub-beams of the transmitted radar beam goup. Thus, a passive interference indication pulse initially applied simultaneously to each passive interference indication channel, is applied successively to respective passive interference indication gates 171–179. These time differentiated passive interference indication pulses, pulse width correlated to the sub-beam pulse widths, successively gate on the passive interference indication gates. Each of these gates provides, for the duration of the applied passive interference indication pulse, a passive interference simulation pulse signal at the frequency of the corresponding oscillator. As in target generation, the oscillator signals applied to respective passive interference indication gates correspond in frequency to that of the respective sub-beam of the transmitted radar beam group. The result is nine frequency and time differentiated passive interference simulation signals corresponding in frequency and time to the frequency and time of transmission for respective sub-beams of the transmitter radar beam group.

The nine frequency and time differentiated passive interference simulation signals are successively applied to a summing amplifier 202. Summing amplifier 202 combines the nine discrete passive interference simulation signals into a multi-pulse simulated passive interference echo signal. This simulated passive interference echo signal is applied via a line to 203 to a variable gain amplifying circuit 204. Amplifying circuit 204 provides gain control to adjust the amplitude of the signal to be compatible with the radar input requirements employed by the frequency scan radar system. Accordingly, the simulated passive interference echo signal from amplifying circuit 204 comprises a multi-pulse, multi-frequency signal corresponding in frequency and time differentiation to the echo return signal which would be received by the frequency scan radar system from passive interference in the form of ground clutter or chaff at the coordinates assigned to the simulated ground clutter and chaff.

Up to this point, the discussions of the radar elevation simulation system has pertained to the frequency scan transmission mode of a frequency scan radar system. In this transmission mode, the radar elevation simulation system generates multi-pulse simulated target and simulated passive interference echo signals corresponding to the actual echo returns which would result from the transmission of multi-pulse radar beam groups. The radar elevation simulation system according to the present invention is also capable of simulation echo return signals from targets and passive interference (in the form of ground clutter and chaff) for the long pulse and pulse compression transmission modes of a frequency scan radar system.

Referring again to the functional diagram in FIG. 1, when the frequency scan radar system is switched to the long pulse transmission mode, a long pulse target indication circuit is functionally incorporated within the target generation channel of the radar elevation simulation system. This long pulse target indication circuit then controls the generation of the corresponding simulating target echo return signals. Analogously, when the radar system switched to the pulse compression transmission mode, a pulse compression target indication circuit is functionally incorporated within the target generation channel to control the generation of the simulated target echo signals. Thus, with simulated target generation in either the long pulse or pulse compression transmission mode, the radar elevation simulation system can return signals from long pulse and pulse compression radar transmissions. To control the generation of these simulated passive interference echo signals, a long pulse and pulse compression mode passive interference indication circuit is functionally incorporated within the passive interference generation channel of the radar elevation simulation system.

Considering first target generation for the long pulse transmission mode and the schematic diagram in FIG. 3. As noted above, in the long pulse transmission mode the frequency scan radar system transmits one long pulse corresponding to the total duration of a multi-pulse radar beam group (nine times three or twenty seven microseconds in the above example). The radar elevation simulation system according to the present invention senses the change from frequency scan transmission mode to long pulse transmission mode and changes simulation techniques accordingly. The target generation channel of the radar elevation simulation system is used up to and including delay lines 81–89. When the frequency scan radar system is switched to the long pulse transmission mode, a long pulse switch voltage generated at the radar system is applied via line 5 and line 145a to one of the inputs to a NOR gate 145. The output of NOR gate 145 is coupled via line 146 to each of the target indication gates 101–104 and 106–109. In response to the long pulse switch voltage, NOR gate 145 applies a disabling signal via line 146 to these target indication gates. This disables each of the target indication channels associated with beam selector circuit 54 except the target indication channel 5 associated with target indication gate 105.

The long pulse switch voltage is also applied via line 5 to a retriggerable one-shot 120. The output of one-shot 120 is coupled, via line 121, through OR gate 90 to target indication gate 105. The long pulse switch voltage enables one-shot 120 which can then be triggered by means of a target indication pulse applied via the non-disabled target indication channel 5 and line 70. From above, if the target elevation voltage designating a simulated target corresponds to the radar elevation angle for the sub-beam 5 of the transmitted radar beam group, beam selector circuit 54 and beam selection gate 75 generate (when clocked by a target video pulse) a target indication pulse. This target indication pulse is applied through delay line 85, via line 70, to one-shot 120, triggering the one-shot.

The output from one-shot 120 comprises a pulse corresponding in duration to the total duration (27 microseconds) of a transmitted multi-pulse one-shot output applied to target indication gate 105 gates on the oscillator signal from oscillator 95, generating a simulated target signal. Since, in the preferred embodiment, oscillator 95 associated with target indication channel 5 (and, accordingly sub-beam 5) corresponds to the long pulse transmission frequency for the frequency scan radar system, the simulated target signal gated by the output from one-shot 120 also corresponds in duration and frequency to the long pulse transmission of the radar system. This long pulse simulated target signal is coupled through summing amplifier 112 and amplifying circuit 114 and comprises the simulated target echo signal for the long pulse transmission mode.

Consider, now target generation in the pulse compression transmission mode (FIG. 3). In this mode, as previously noted, the frequency scan radar system transmits one long pulse of constantly varying frequency. The corresponding simulation technique (as in the case of the long pulse transmission mode) utilizes the target generation channel of the radar elevation simulation system up to and including delay lines 81–89. In the pulse compression mode, a pulse compression switch signal generated at the radar system is applied via line 6 and line 145b to NOR gate 145. The resulting disabling signal disables target indication gates 101–104 and 106–109. An additional disable signal via line 147 disables gate 105 in this pulse compression mode. Simulated target generation is then controlled by a pulse compression mode circuit 130.

Pulse compression mode circuit 130 includes a flip-flop circuit 131 coupled to receive the pulses compression switch voltage from the frequency scan radar system via line 6. The two outputs of flip-flop circuit 131 are both coupled to trigger inputs of dual one-shot circuit 132. One of the one-shot outputs from the dual one-shot circuit is used to enable a voltage controlled oscillator 135 and to simultaneously initiate a ramp generator 133 having an output coupled to the voltage controlled oscillator. The other output from dual one-shot circuit 132 is used to enable a voltage controlled oscillator 136 and to simultaneously initiate a ramp generator 134 having an output coupled to the voltage controlled oscillator. The outputs of voltage controlled oscillators 135 and 136 are applied via, respectively, lines 135a and 136b to summing amplifier 112.

When the three-dimensional radar system is switched to the pulse compression mode, the pulse compression switch voltage enables flip-flop circuit 131 which can then be triggered by means of target indication pulses applied via the non-disabled target indication channel 5 and line 70. The target indication pulses to flip-flop circuit 131 cause it to alternately trigger dual one-shot 132, alternately initiating ramp generators 133 and 134.

When initiated by dual one-shot circuit 132, ramp generator 133 applied a ramp voltage to voltage controlled oscillator 135, generating a target simulation signal output of a constantly varying frequency. Similarly, ramp generator 134 applies a ramp voltage to voltage controlled oscillator 136, generating a second target simulation signal output of a constantly varying frequency. The ramp slope and shape for each of ramp generators 133 and 134 are adjusted to match the characteristics of the dispersive delay line for the frequency scan radar system. Accordingly, the profile of the corresponding voltage controlled oscillator output is also matched to the characteristics of the radar system's dispersive delay line. These variable frequency outputs from voltage controlled oscillators 135 and 136 (coupled through summing amplifier 112) comprise the simulated target echo signal for simulating a target echo from a pulse-compression-mode radar transmission.

The above described target echo simulation technique for the pulse compression mode can be fully appreciated when compared with the simulation technique for the long pulse mode. As noted above, the use of the long pulse transmission mode unavoidably "stretches" the size profile of a target. Thus, two (or more) targets closer together than the radar systems long pulse width generally cannot be independently resolved in this mode. Specifically, with respect to the radar elevation simulation, assume that two separate simulated targets, closer together than the long-pulse width, are assigned to the angular sector defined by the sub-beam 5 (the long pulse sub-beam) of a transmitted radar beam group. Each simulated target would be designated in the target generation channel by means of a respective target indication pulse generated in beam selection circuit 54 (FIG. 2). However, since these two target indication pulses would be separated by less than the long-pulse width (embodied in long pulse one-shot 120), only one simulated target signal would be generated by target indication gate 105. Accordingly, the resulting single-pulse simulated target echo signal from summing amplifier 112 would indicate only a single target.

This is to be contrasted with the simulation technique for the pulse compression transmission mode. In this mode, the target indication pulses for the above two targets would be applied via line 70 to flip-flop circuit 131. As described above, this would result in two separate variable frequency outputs from voltage controlled oscillators 135 and 136 being applied to summing amplifier 112. As a result, the simulated target echo signal would be comprised of two variable frequency pulses indicative of two simulated targets. In this manner, the two simulated targets, separated by less than the long-pulse width, could be resolved and displayed without any simulation generation interference. (Of course, three or more targets could be thus presented merely by the addition of parallel ramp generator and voltage controlled oscillator networks.)

Finally, consider FIG. 4 and the passive interference simulation technique for the long pulse and pulse compression transmission modes. Analogous to target generation in the long pulse and pulse compression modes, passive interference generation in the long pulse and pulse compression transmission modes utilizes the passive interference generation channel of the radar elevation simulation system up to and including delay lines 161-169. When either the long pulse or pulse compression mode is selected, the corresponding switch voltage generated at the frequency scan radar system is applied via either line 5a (for the long pulse mode) or line 6a (for the pulse compression mode) and a line 152, through an inverter 154, to passive interference indication gates 171 to 174 and 176 to 179. This disables the corresponding passive interference indication channels, passive interference generation being controlled by a retriggerable one-shot 150. Isolation devices, such as diodes 25 and 26 for example, may be included in lines 5a and 6a, respectively, to avoid shorting the circuit of FIG. 3.

The mode switch voltages from the frequency scan radar system are also applied, via lines 5a and 6a to the enabling input of one-shot 150. This enables one-shot 150 which can be triggered by means of a passive interference indication pulse appearing on the non-disabled passive interference indication channel 5 and applied to the one-shot via line 155. From above, the passive interference indication signals corresponding to elevation/range differentiated ground clutter and chaff are generated by ground clutter and chaff selection network 140 when clocked by chaff video or ground clutter video pulses. A passive interference indication pulse appearing on passive interference indication channel 5 (delay line 165, OR gate 156 and passive interference indication gate 175) triggers one-shot circuit 150 to provide a pulse output having a duration corresponding to the pulse width for the long pulse and pulse compression radar transmission. This one-shot output is applied via line 151 and OR gate 156 to the non-disabled passive interference indication gate 175.

The output from one-shot 150 gates on passive interference indication gate 175 and the associated oscillator 185. This provides a passive interference simulation signal at the frequency of oscillator 185, which, from above, corresponds to the frequency of sub-beam 5 of the transmitted radar beam group. When coupled through summing amplifier 202, the output from passive interference indication gate 175 comprises the simulated passive interference echo signal for simulating an echo return from ground clutter or chaff.

The difference between the simulation techniques in passive interference generation and target generation for the pulse compression transmission mode should be noted (the simulation techniques in the long pulse mode being identical). As described above, simulated target generation for the pulse compression mode utilizes a pair of variable controlled oscillators, 135 and 136, to permit the simulation of two targets closer together than the long pulse width without simulation generation interference. This contrasts with the use of one-shot 150 to generate a single simulated passive interference echo signal for the pulse compression as well as the long pulse transmission mode. In simulated passive interference generation, however, and particularly in the case of chaff, there exists in effect many targets closely spaced. To separate these targets would require many ramp generator and variable controlled oscillator networks resulting in excessive complexity and expense to achieve a dubious increase in simulation accuracy. Accordingly, the radar elevation simulation system according to the present invention simplifies the generation of simulated passive interference for the pulse compression mode by generating a single long simulated passive interference echo signal at a constant frequency (unaffected by the dispersive delay line of the frequency scan radar system).

Obviously, other embodiments and modification of the present invention will readily come to those of ordinary skill in the art having the benefit of the teachings presented in the foregoing description and the drawings. It is therefore to be understood that this invention is not to be limited thereto and that these modifications and embodiments are intended to be included within the scope of the appended claims.

What is claimed is:

1. A system for simulating a predetermined environment in the elevation dimension for a frequency scan (inertialess) 3D radar system; the frequency scan 3D radar system scans in the elevation dimension by means of a series of directable, radar pencil-beams of progressively variable elevation, each of the beams commencing with a different initial frequency which is progressively altered to produce a group of discrete sub beams of progressively variable elevation covering a corresponding sector of the vertical plane with at least some angular overlap of the sub beams within the multi-beam group; said elevation simulation system comprising:

a. elevation sensing means coupled to receive a radar elevation code signal from the 3D radar system for generating a corresponding radar elevation voltage (signal) representing the instantaneous elevation angle of the transmitted radar beam;

b. simulated video generating means incorporating a predetermined simulated target environment with each simulated target being assigned azimuth and elevation coordinates, being designated in the elevation dimension by a target elevation voltage signal; in a given azimuth plane, (said simulated video generating means) providing a target elevation voltage (signal) when said target elevation voltage signal and said radar elevation voltage (signal) compare within limits preset to represent radar beam width; said target elevation voltage signal being synchronized with the radar beam transmissions from the 3D radar system;

c. beam selection means having at least one (target indication) channel for each of the elevation differentiated, angularly overlapping sub beams of a respective radar beam for comparing the radar elevation voltage signal with a respective target elevation voltage signal to obtain an indication of target elevation position within the sector defined by the corresponding radar beam and providing a simulated target indication pulse for each corresponding one of the group of sub beams in which said respective simulated target is to appear in accordance with the degree of sub beam angular overlap;

d. target/sub beam differentiating means responsive to the simulated target indication pulses (signals) to provide a corresponding number of beam differentiated target signals progressively time and frequency differentiated to correlate with the respective transmission frequencies and times of the corresponding sub beams; and e. target simulation interface means for transmitting to said 3D radar system the beam differentiated target signals such that a simulated target is indicated.

2. The radar elevation simulation system as recited in claim 1 wherein said simulated video generating means comprises:
   a. a simulated target generation computer in which the simulated target environment is stored for providing the target elevation pulses; said simulated target generation computer also providing a target video clock pulse synchronized with the transmission of the radar beams by said 3D radar system;
   b. a plurality of target selection circuits (gating), at least one for each simulated target stored in said simulated target generation computer, each one establishing a course gate to pass a respective target elevation voltage signal when a target video clock pulse is present if said respective target elevation voltage signal and said radar elevation voltage compare within limits preset to represent radar transmission beam width (and a target video clock pulse is present).

3. The radar elevation simulation system as recited in claim 2 wherein each one of said plurality of target selection circuits comprises:
   a. a respective pair of operational amplifiers forming a dual comparator configuration with plus and minus voltage limits to represent the radar beam width for said 3D radar system coupled to receive (said radar elevation voltage signal and) a respective target elevation voltage signal, and
   b. said respective pair of operational amplifiers establishing an elevation comparison gate to pass respective target elevation voltage if it compares within the preestablished limits for the 3D radar system; and
   c. a respective course gate circuit coupled to receive the respective comparison gated target elevation voltage for passing the respective target elevation voltage when a target video clock pulse is present.

4. The radar elevation simulation system as recited in claim 2 wherein said beam selection means comprises:
   a. a comparator for providing an output elevation difference voltage signal corresponding to the difference between the radar elevation voltage signal and a respective target elevation voltage signal indicating a simulated target; said elevation difference voltage signal representing the elevation of the respective simulated target above the bottom of a corresponding radar beam (transmission);
   b. at least n+m target elevation comparators coupled to receive said elevation difference voltage, where n is the number of sub beams in a radar beam and m is the predetermined number of sub beams in which a target normally appears as a result of sub beam angular overlap; said n+m comparators being referenced to progressively increasing reference voltages such that a progressive number of said comparators provide beam selection voltage outputs correlated to increasing target elevation voltage magnitudes; and
   c. at least n beam selection gates one for each of the n sub beams, defining n target selection channels, said n beam selection gates being responsive to beam selection voltage outputs from successive comparators, indicating an elevation difference voltage of corresponding magnitude, to provide at most m respective target indication pulses; for successive numbers of beam selection voltage outputs of from 1 to n+m, the target indication pulses being provided according to the following progression: (1), (1,2), ... (1,2 ... m), (2,3, ... m+1), ... (n−m, n−m+1, ... n), (n−m+1, n−m+2, ... n), ... (n), such that the target indication pulses appear on at most m adjacent (successive) target indication channels (of said beam selection means), corresponding to an indicated simulated target appearing in at most m adjacent (successive) sub beams of a respective radar beam.

5. The radar elevation simulation system as recited in claim 4 wherein said target/sub beam differentiating means comprises:
   a. at least n delay lines and n target indication gates, each delay line being associated with a respective one of said target indication gates and correspondingly with a respective one of the channels of said beam selection means of said n beam selection; said n delay lines introducing successively varied time delays to complement the respective radar transmission delays associated with each of the n sub beams of a respective radar beam;
   b. each of said at least n target indication gates being coupled to a respective one of said n delay lines; and
   c. at least n oscillators each coupled to a respective one of said n target indication gates, said n oscillators each providing a frequency differentiated signal corresponding in frequency to a respective sub beam;
   d. each of said n target indication gates being responsive to a respective target indication pulse applied through a respective delay line to provide a respective beam differentiated target (pulse) signals in the time and frequency domain to the respective sub beams of a respective radar beam.

6. The radar elevation simulation system as recited in claim 5 wherein said target simulation interface means comprises:
   a. a summing amplifier coupled to each of the target indication gates associated with the n target indication channels for combining into a single target simulation signal the beam differentiated (pulse) signals from respective target indication gates; said target simulation signal comprising a train of m successively time and frequency differentiated pulses (signals); and
   b. a first variable gain amplifying circuit connected to a mixing network for heterodyning the frequencies comprising said simulated target indication signal to the radar return video frequencies employed by the 3D radar system.

7. The radar elevation simulation system as recited in claim 6 further comprising:
   a. passive interference generation means for generating a simulated ground clutter pulse at short range and low radar elevation angles and a simulated chaff pulse at longer range and higher radar elevation angles;
   b. interference/sub beam differentiating means responsive to the simulated ground clutter and simulated chaff pulses to provide at least n time and frequency differentiated passive-interference signals corresponding in the time and frequency domain to the n sub beams in respective transmitted radar beams;
   c. passive interference interface means for transmitting said time and frequency differentiated passive-interference signals to said 3D radar system, thereby simulating a passive interference environment of ground clutter and chaff to said 3D radar system.

8. The radar elevation simulation system as recited in claim 7 wherein said passive interference generation means comprises:
   a. elevation limit means coupled to receive the radar elevation voltage (signal) for providing an elevation limit signal while the radar beam elevation angle as represented by the instantaneous radar elevation voltage (signal) is at or less than the lowest radar beam elevation angle at which simulated chaff is to appear;
   b. range limit means responsive to a range zero sync pulse from said 3D radar system to provide a range limit signal for a time corresponding to a range of from range-zero out to the longest range at which ground clutter is to appear; and
   an interference indication gate coupled to said range limit means and said elevation limit means; being responsive to an externally generated simulated ground clutter video signal to gate a simulated ground clutter pulse when an elevation limit signal and a range limit signal are present, and being responsive to an externally generated simulated chaff video signal to gate a simulated chaff pulse in the absence of either a range limit signal or an elevation limit signal.

9. The radar elevation simulation system as recited in claim 7 wherein said interference/sub beam differentiating means comprises:
   a. at least n sub beam channels each being defined by a respective delay line, a respective passive interference logic gate and a respective oscillator coupled to each said respective passive interference logic gate;
   b. an amplifier coupled to receive the simulated ground clutter and simulated chaff pulses (from said passive interference generation means) for applying the passive interference signals to each of said n sub beam channels;
   c. said respective delay lines introducing progressively varying time delays to complement the respective radar transmission delays associated with each of the n sub beams of a respective radar pencil beam;
   d. said respective oscillators providing passive interference signals of progressively modified frequency to complement the frequency associated with each respective sub beam;
   e. said respective passive interference logic gates passing the frequency differentiated passive interference signals in the presence of the time differentiated passive interference pulses applied through said respective delay lines.

10. The radar elevation simulation system as recited in claim 9 wherein said passive interference interface means comprises:
    a. a summing amplifier coupled to each of said n passive interference gates for combining the n time and frequency differentials passive interference signals into a single time and frequency differentiated interference simulation signal; and
    b. a second variable gain amplifying circuit connected to said mixing network for heterodyning the frequencies comprising said passive interference simulation signal to the radar return video frequencies employed by said 3D radar system.

11. The radar elevation simulation system as recited in claim 10 wherein the 3D radar system includes long pulse and pulse compression radar transmission modes; said radar elevation simulation system further including:
    a. LP/PC interference simulation means responsive to the switching of the 3D radar system to either the long pulse or the pulse compression mode of radar transmission to disable each of said n passive interference indication gates except the respective one with the oscillator corresponding in frequency to the long pulse mode from frequency of 3D;
    b. said LP/PC interference simulation means being responsive to either an externally generated simulated ground clutter video or simulated chaff video signal to provide a (passive interference indication) (pulse) to gate on the respective passive interference gate, generating a passive interference simulation signal.

12. The radar elevation simulation system as recited in claim 6 wherein the 3D radar system includes a long pulse radar transmission mode; said radar elevation simulation system further comprising:
    a. long pulse mode simulation means responsive to the switching of the 3D radar system to the long pulse radar transmission mode to disable each of said n target indication gates except the respective target indication gate associated with the oscillator corresponding in frequency to the long pulse transmission frequency of the 3D radar system;
    b. said long pulse mode simulation means being responsive to a target indication pulse appearing on the target sub channel associated with said respective (non-disabled) target indication gate to provide a target indication pulse corresponding in duration to the long pulse mode transmission time of the 3D radar system, the resulting target simulation signal being of a corresponding duration at a frequency corresponding to the long pulse mode transmission frequency of the 3D radar system.

13. The radar elevation simulation system as recited in claim 12 wherein the 3D radar system includes a pulse compression radar transmission mode using a dispersive delay line for pulse compression; said radar elevation simulation system further comprising:
    a. said long pulse mode simulation means being operable for disabling the N target indication gates associated with the N target simulation channels while the 3D radar system is in the pulse compression radar transmission mode;
    b. variable frequency (signal) means for providing a plurality of variable frequency pulses each of a constantly varying frequency correlated to the characteristics of the radar system dispersive delay line and of a duration corrresponding to the radar pencil-beam transmission time; said variable frequency pulse (signal) means applying the variable frequency pulses to said summing amplifier when the 3D radar system is in the pulse compression radar transmission mode and when a target indication pulse-signal appears on a selected one of said target simulation channels such that a plurality of target simulation signals can be simulated without interfering with each other's simulation generation.

14. The radar elevation simulation system as recited in claim 13 wherein each variable frequency means comprises:

a. at least one pulse compression one shot having a voltage pulse output with a duration less than one-half the radar pencil beam transmission time;
b. triggering means responsive to the target indication pulses to alternately trigger a pair of pulse compression one-shots;
c. a pair of ramp generator circuits each responsive to the voltage pulse output from a respective pulse compression mode one-shot to generate a ramp voltage; said ramp voltage correlated in slope and shape to the characteristics of the dispersive delay line of the 3D radar system;
d. a pair of voltage controlled oscillators each responsive to a respective ramp voltage to provide a signal output of a progressively varying frequency such that when applied through said summing amplifier to the 3D radar system, two targets are simulated.

* * * * *